United States Patent Office 3,791,953
Patented Feb. 12, 1974

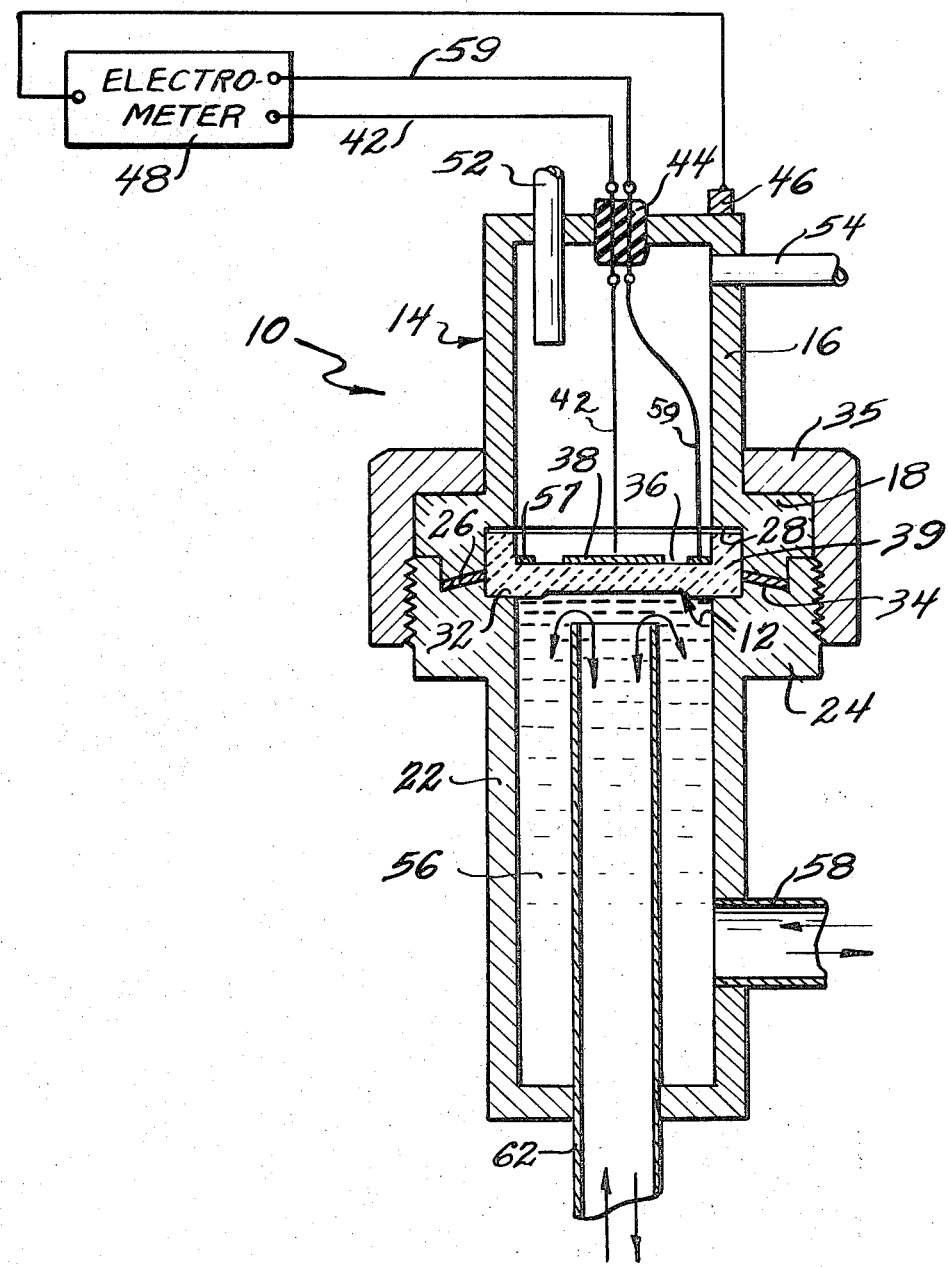

3,791,953
SELF-SEALING ELECTROCHEMICAL OXYGEN METER
Bertram Minushkin, Greensburg, Pa., and George Kissel, Bayport, N.Y., assignors to the United States of America as represented by the United States Atomic Energy Commission
Filed Oct. 31, 1972, Ser. No. 302,431
Int. Cl. G01n 27/46
U.S. Cl. 204—195 S          5 Claims

ABSTRACT OF THE DISCLOSURE

An electrolytic cell for measuring oxygen activity in liquid sodium in which the solid electrolyte is in the shape of a disc surrounded and supported by an annular spring seal, and incorporating features which provide an additional back-up seal, utilizing the product of chemical reactions between the fluids to be contained for forming a seal in situ.

BACKGROUND OF THE INVENTION

The invention described herein was made in the course of, or under a contract with the United States Atomic Energy Commission.

In sodium cooled nuclear reactors the presence of small amounts of oxygen is an important factor in corrosion and mass transfer which affects the life and safety of the reactor, as is well known in the art. Certain materials considered to be otherwise quite suitable for specific applications in a nuclear reactor, stainless steel and vanadium, for example, are readily corroded by the oxygen in solution, even in very small amounts, such as a few p.p.m. (parts per million) of the oxygen.

While considerable precautions are generally taken to insure that the presence of oxygen will be kept to the barest possible minimum, it is quite apparent that during normal operation of the reactor, regular tests for the presence of oxygen should be made to insure that the level of oxygen will not increase unexpectedly to unsafe values. Furthermore, a sudden, though slight, increase in oxygen might be the first detectable indication of a failure or otherwise undetected deviation from normal operation and it would be exceedingly helpful if the increase were to be detected immediately so that corrective action can be taken before extensive damage occurs.

Among the various techniques and devices developed to measure the presence of oxygen dissolved in liquid metals is the voltaic cell, such as the device described in U.S. Pat. 3,378,478 issued on Apr. 16, 1968, and that appearing in U.S. application Ser. No. 85,002 filed on Oct. 29, 1970, now U.S. Pat. No. 3,711,394, in which we along with Francis J. Salzano are co-inventors.

In the aforementioned patent application, a solid electrolyte in the shape of an elongated tube closed at one end is utilized. The long tube shape is dictated by the necessity for making a sodium and gas tight seal at low temperatures. Since elastomers are used, the seal is made at the top end where temperatures are low. The resulting cell assembly has a temperature gradient from top-to-bottom which may affect performance. Further, in a reactor environment, the presence of radiation will lead to rapid deterioration of the elastomer seal.

These ceramic tubes must be fabricated by slip-casting or isostatic pressing and then sintering. The dimensions of the finished tubes are difficult to control accurately and the slip-cast tubes in particular contain impurities which deleteriously affect both the electrochemical behavior and resistance to attack by sodium. The isostatically pressed and sintered tubes are inordinately expensive and time consuming to manufacture and still contain undesirable impurities.

SUMMARY OF THE INVENTION

The present invention overcomes many of the problems associated with the preparation and use of tubular shaped ceramic elements by incorporating thin discs of the electrolyte to perform the function of the tubes. Such discs can be manufactured relatively easily by isostatic or hot pressing and sintering or other known ceramic techniques. The resulting product has significantly higher purity, ideal solid electrolyte properties and the resulting cell has the advantage of being essentially isothermal, thermal gradients being a problem in the tubular element.

The problem of providing adequate sealing is accomplished in accordance with the principles of this invention by providing a deformable metal seal ring and a backup or supplementary seal utilizing the product of chemical reactions between the fluids to be contained for forming a seal in situ.

In a preferred embodiment, the cell consists of a thin ceramic solid electrolyte disc mounted in a special metal flange coupling employing a metal annular spring for a seal. When assembled, the spring is compressed by the flange against the disc. Sodium fills the space below the disc while the gaseous reference electrode containing oxygen is above the disc and the spring. Because of the confinement, the spring seal and close tolerances the ability of sodium to leak past the seal is extremely limited. Any sodium which gets through the inner or outer edge of the spring seal comes in contact with oxygen gas or air and is immediately oxidized to sodium oxide ($Na_2O$). The $Na_2O$ forms a very hard seal material which prevents leakage. Furthermore, if a leak should develop, the seal, utilizing a sealant material formed in situ from the Na and $O_2$ will be self-healing.

It is thus a principal object of this invention to provide an improved voltaic cell for measuring the oxygen content of molten sodium.

Other objects and advantages of this invention will hereinafter become obvious from the following detailed description of a preferred embodiment of this invention.

BRIEF DESCRIPTION OF THE DRAWING

The figure shows an elevation view in section of a preferred embodiment of this invention.

DESCRIPTION OF THE PREFERRED EMBODIMENT

Referring to the figure, voltaic cell 10 incorporates a gaseous oxygen electrode and is utilized in the manner described in the previously identified U.S. patent application Ser. No. 85,002.

Cell 10 consists of a thin ceramic circular plate or disc 12 of electrolytic material mounted as illustrated within a housing 14 which consists of an upper closure 16 with a flange 18 and a lower cylindrical housing 22 with a flange 24. Flanges 18 and 24 are shaped such that when housing 14 is assembled as illustrated an annular groove 26 with upper and lower shoulders 28 and 32 are formed. Disc 12 is surrounded by a tight fitting flat annular spring 34 which is compressed in the manner shown when housing 14 is assembled. Flanges 18 and 24 may be locked together by a threaded clamp 35 or bolts (not shown).

Disc 12 is provided with a central narrow section 36 on which is deposited a porous coating or layer 38 of any metal in which oxygen will dissolve but with which it will not react, and an annular thickened section 39 on which is deposited another annular separate metal layer 57 of similar material spaced as illustrated. In the particular embodiment described, either gold or platinum may be used for layers 38 and 57. Layer 38 may occupy the central portion of disc 12 as illustrated and may be surrounded by a separate annular layer 57, neither layer contacting each other or the metal of housing 14.

The ceramic material employed for disc 12 is a solid electrolyte made from a metallic oxide material that has a crystal structure containing oxygen ion vacancies such that at high temperature the material conducts electricity predominately by the migration or transfer of oxygen ions through the crystalline structure of the material. Materials of this type and suitable for this invention are known in the art and are more particularly identified in the aforementioned U.S. Pat. No. 3,481,855. In the particular embodiment described herein the electrolytic ceramic material is $ThO_2$ with a minor amount (less than 50%) of $Y_2O_3$, for example 15 w/o $Y_2O_3$ or 7.5 w/o $Y_2O_3$.

An electrical connection 42, preferably of stainless steel, is spot welded or otherwise electrically connected to coating 38 and extends out through the top of housing 14, passing through a hermetically sealed electrical insulator 44 where it may be joined to ordinary copper conductors. The galvanic cell of which assembly 10 is a part is completed by contact 46 making contact with sodium 56 through the stainless steel housing 14 at approximately the same temperature as wire 42. A differential voltmeter 48 in the circuit measures the EMF generated and provides an auxiliary or guard voltages, equal to the EMF generated, to ring 57 through conductor 59. If the annular metal layer (guard ring) 57 is not used the auxiliary or guard voltage is not required.

A tube 52 passing through the upper end of housing 16 supplies the oxygen containing gas to within assembly 10 at a point above disc 12 while a vent tube 54 carries away the exhausting gas. The flow of gas may be reversed, entering tube 54 and exhausting through tube 52. Alternately, a sealed system may be employed whereby the inside of the assembly may be periodically purged by flowing gas and flow isolated at other times by valves on lines 52 and 54. The oxygen containing gas can be pure oxygen or oxygen mixed with an inert gas such as argon.

In order to insure proper contact of the sodium with the bottom surface of disc 12 a conduit 58 is provided to deliver sodium up to the bottom surface of disc 12 while lower housing 22 is provided with a conduit extension 62 to carry away the sodium as shown by the arrows. A pump (not shown) in conduit 58 may be provided to obtain the desired circulation, while if desired, flow may be reversed.

Assembly 10 is installed in the system so that liquid sodium 56 flows into the lower cylindrical housing 22 past or along the electrolyte disc 12 and exits at the bottom of housing 22.

In the operation of assembly 10, due to the tight fit and sealing principle of spring 34, very little sodium will leak. Any sodium which does pass, however, will be immediately oxidized by the oxygen in the gaseous electrode forming $Na_2O$ which is a very hard seal material that prevents further leakage. Any further leaks which may develop would be similarly ended, thus forming a self-healing arrangement.

The sodium should contact the bottom of the disc 12 and be confined below the inner and outer corners of the annular seal ring 34 which form a seal in the corners of flange 24 and on the cylindrical surface of disc 12.

The gap formed by the shoulders 28 and 32 positions the disc 12. Upon assembly, seal ring 34 is completely confined within the annular gap 26 formed by the corresponding surfaces of the flange 18 and 24 and presses against the outside cylindrical surface of the disc 12 to hold it radially in position. At the same time, during assembly, disc 12 is forced, by the action of the seal ring 34, down against the shoulder 32 which then holds it in position. A small clearance is permitted between the disc 12 and the shoulder 28 to avoid crushing the disc 12.

In the arrangement described for the preferred embodiment, porous layer 38 would have a typical thickness of about 0.1 micron while disc 12 in its central section would have a thickness of about $\frac{1}{32}$ to $\frac{1}{8}$-inch. The electrolytic material for disc 12 would be $ThO_2$-15 w/o $Y_2O_3$ and the temperature of the sodium about 400° C. to 500° C.

It is thus seen that there has been provided a unique construction which simplifies and makes more reliable a voltaic cell for use in monitoring the oxygen content of molten sodium.

What is claimed is:

1. An electrode assembly for use in a cell for the detection of oxygen dissolved in liquid sodium comprising:
   (a) a disc shaped element of solid electrolyte material having first and second oppositely facing surfaces;
   (b) a porous coating of metal in which oxygen will dissolve but not react covering at least a portion of the first surface of said element;
   (c) housing means supporting said element for partial immersion in said liquid sodium such that the latter would be in contact with the second surface of said element;
   (d) annular spring sealing means surrounding and sealing said element to limit leakage of sodium into the interior of said housing;
   (e) contact means of electrically conducting material in contact with said porous coating and extending out of said housing means;
   (f) means supplying an oxygen containing gas into said housing means and in contact with the first surface of said element having said coating; and
   (g) backup seal means formed in situ by chemical reaction of oxygen and leaked sodium in confined and restrictive spaces adjacent said sealing means.

2. The assembly of claim 1 in which said solid electrolyte material is $ThO_2$ containing a minor amount of $Y_2O_3$.

3. The assembly of claim 2 in which said metal is selected from the group consisting of gold and platinum.

4. The assembly of claim 3 having means to maintain flowing sodium in continuous contact with the second surface of said element.

5. The assembly of claim 4 in which the first surface of said disc is provided with a second portion thereof having said porous coating spaced from the first portion and separate contact means in contact with said second portion extending out of said housing means.

References Cited

UNITED STATES PATENTS

| | | | |
|---|---|---|---|
| 3,481,855 | 12/1969 | Kolodney et al. | 204—195 S |
| 3,657,094 | 4/1972 | Hans et al. | 204—195 S |
| 3,378,478 | 4/1968 | Kolodney et al. | 204—195 S |
| 3,691,023 | 9/1972 | Ruka et al. | 204—1 T |

FOREIGN PATENTS

| | | | |
|---|---|---|---|
| 1,235,091 | 6/1971 | Great Britain | 204—195 S |

GERALD L. KAPLAN, Primary Examiner